(12) United States Patent
Knoll et al.

(10) Patent No.: US 6,386,221 B1
(45) Date of Patent: May 14, 2002

(54) JOURNAL MOUNTED SOLENOID VALVE

(75) Inventors: Christopher C. Knoll, Fairview; Timothy L. Johnson; Anthony Medina, both of Erie, all of PA (US)

(73) Assignee: Snap-Tite Technologies, Inc., Wilmington, DE (US)

( * ) Notice: Subject to any disclaimer, the term of this patent is extended or adjusted under 35 U.S.C. 154(b) by 0 days.

(21) Appl. No.: 09/827,377

(22) Filed: Apr. 5, 2001

(51) Int. Cl.[7] .............................................. F15B 13/044

(52) U.S. Cl. ................................ 137/15.21; 137/454.2; 137/580; 137/625.65

(58) Field of Search ........................... 137/15.21, 454.2, 137/580, 625.65

(56) References Cited

U.S. PATENT DOCUMENTS 6,012,700 A * 1/2000 Johnson et al. ..... 137/625.65 X

* cited by examiner

Primary Examiner—Gerald A. Michalsky
(74) Attorney, Agent, or Firm—Woodling, Krost & Rust; Kenneth L. Mitchell

(57) ABSTRACT

A solenoid valve is mounted in the bore of a ferromagnetic journal. Mounting the solenoid valve in the journal conserves space on the firewall of a vehicle where the solenoid is typically located. Journal mounting also minimizes the length of the air line necessary to supply air to the solenoid valve. Use of a ferromagnetic journal as part of the magnetic circuit allows full use of the journal bore for the components of the solenoid valve. A leak vent path is provided as well as a principal vent path in the flux flanges of the solenoid valve. The solenoid valve controls the flow of air through a seal which engages a rotating coupling of a clutch which operates a fan.

25 Claims, 18 Drawing Sheets

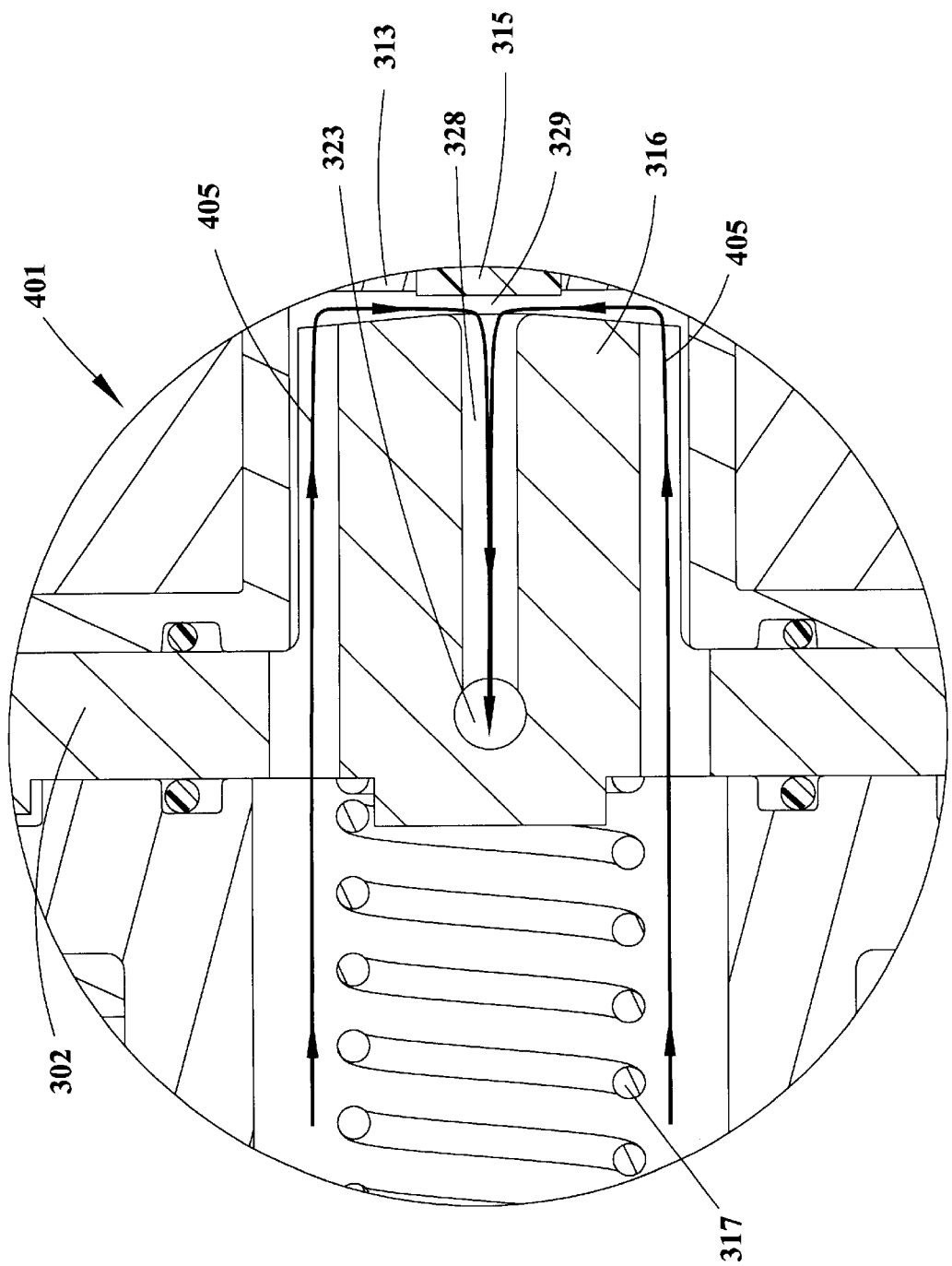

JOURNAL MOUNTED SOLENOID VALVE

FIELD OF THE INVENTION

The invention is a solenoid valve mounted within the bore of a ferromagnetic journal for operating a clutch which drives an engine cooling fan.

BACKGROUND OF THE INVENTION

U.S. Pat. No. 6,092,638 to Vatsaas issued Jul. 25, 2000 discloses a spineless rotational control apparatus otherwise known as a clutch. FIG. 1 of the '638 patent has been designated as prior art in the drawings of the instant invention.

FIG. 1 is a cross-sectional view of the prior art illustrating a clutch operated by the application of air pressure through a seal. The prior art clutch, journal and cartridge are generally indicated with reference numeral 100. Journal 101 includes a cartridge 102. Belt drive sheave 103 is rotatably driven by belts not shown. Belt driven sheave 103 rotates with respect to journal 101 as bearings 116 are interposed between the sheave and the journal 101.

Cartridge 102 includes a seal 117. Seal 117 engages coupling 114 for the transmission of air pressure which is available from an air supply source 106. Cap 104 is secured to sheave 103 by a snap ring 115. Cap 104 rotates in unison with sheave 103. When air is supplied to the coupling 114 it is admitted into the volume as indicated by reference numeral 111. When air pressure of sufficient magnitude exists in volume 111 friction surface 110 which is rotating in unison with sheave 103 disengages friction surface 109 which causes a fan (not shown) to stop rotating.

Application of air pressure to volume 11 causes clutch 105 to move leftwardly when viewing FIG. 1 of the instant application. Reference numeral 112 is an arrow indicating movement of the clutch plate 105. Lugs 108 are mounts for a fan blade. Journal 101 is typically affixed to the engine of a large truck as indicated by aperture 107. When the clutch is engaged approximately 125 horsepower is used to drive the fan. The fan is a cooling fan which cools the engine under certain ambient conditions. When the vehicle is operating in a cold or cool environment the cooling of the engine may be sufficient by the ambient atmosphere and/or by the operating conditions of the vehicle. When the fan is needed or when there is no air pressure available, no air is supplied to the volume defined by reference numeral 111 and the friction plates of the clutch engage. When the fan is not needed air is then supplied to the volume 111 resulting in disengagement of the friction surfaces 109 and 110. Since the fan consumes 125 horsepower, it is desirable to operate it only when necessary thus making a clutch necessary.

FIG. 2 is a schematic of the prior art illustrating a solenoid 201 mounted on the fire wall 202 of a vehicle which vents the clutch. FIG. 2A is a schematic of the prior art illustrating a solenoid mounted on the fire wall of a vehicle which supplies air to the clutch. Referring to FIGS. 2 and 2A, reference numeral 200 is a schematic representation of the prior art three-way solenoid valve 201 mounted on fire wall 202, an air line 203 interconnecting solenoid valve 201 and journal 204, and a clutch 205. Journal 204 is shown mounted to the engine block 206. Solenoid valve 201 includes an air supply port labeled A and identified by reference numeral 207 and a vent port labeled B and identified by reference numeral 208. When air is vented from clutch 205, it must travel a considerable distance through the air line 203 and through the three-way solenoid valve 208. Solenoid valve 201 in FIG. 2 is shown deenergized which means if electrical power is lost, clutch 205 will be vented and the fan will be engaged. FIG. 2A illustrates the condition with the solenoid valve energized and air being supplied to the journal and into the clutch for disengaging the fan.

The prior art has the disadvantage of having a solenoid valve remotely mounted on the fire wall 202 with respect to the journal and the clutch. Therefore, in the prior art an air compressor must be interconnected by way of an air line to port 207 on solenoid valve 201. This solenoid valve mounted on the fire wall is then interconnected to the journal 204 mounted on the front of the engine block 206. Therefore, the prior art requires air tubing having at least four connections. An additional disadvantage of the prior art is the capacitance of the air line 203 as indicated in FIG. 2. By capacitance it is meant that air tubing 203 has a certain volume filled with compressed air which must be relieved before the clutch 205 may be engaged. As engine temperature sensors and measurements lag actual engine conditions, it is desirable to engage the fan relatively quickly so as to begin cooling the engine. Engagement and disengagement of the clutch is more accurately controlled with less air tubing volume. Less air tubing volume enables better control of the clutch with respect to time. The clutch can be engaged and disengaged when desired. In other words less air tubing volume optimizes control of the clutch which maximizes clutch engagement wear life.

Referring to FIG. 1, the principal vent is directly through coupling 114, seal 117 and passageway 106. Still referring to FIG. 1 the leak vent 118 is a passageway which extends through journal 101 and locking ring 119. Considerable machining must be performed to create leakage vent 118. The purpose of leakage vent 118 is to protect the bearings 116 from air which leaks between seal 117 and 114 and which flows into volume 120. Pumping air through bearings 116 would contribute to more rapid oxidation of the bearings and their components. Further, pumping air through the bearings will cause loss of lubricants.

SUMMARY OF THE INVENTION

A solenoid valve is mounted in the bore of a ferromagnetic journal which is used to complete the magnetic circuit when the coil is energized. Two flux flanges are employed which together with the plunger and ferromagnetic journal complete the magnetic circuit. The diameter of each of the flux flanges is the same. The flux flange diameter is slightly smaller than the diameter of the bore in the ferromagnetic journal. Typically, the air gap between the flanges and the inside bore of the journal is one to two thousandths of an inch so as to minimize the reluctance of the air gap and thus minimize the magnetomotive force and the size and amperage of the coil. A ferromagnetic material such as carbon steel which has high permeability is preferably used as the journal material.

The solenoid of the instant invention includes a leakage vent path and a principal vent path. The leakage vent begins with apertures in the locking flange of an extension affixed to an adapter which in turn is affixed to the second flange. Air is supplied to a coupling when the coil is energized and any leakage from that coupling is relieved through the apertures and notches of the flanges and finally through an aperture in the housing. The principal vent allows air supplied to the clutch to be evacuated therefrom permitting the clutch plates to engage driving a powerful engine cooling fan. Air from the clutch is evacuated through passageways and bores in the stop and out of a notch in the second flange.

First and second flux flanges made of ferromagnetic material such as steel are employed. Overmolding secures the flux flanges to the bobbin which has the current carrying coil wound therearound. An adapter at the outlet of the stop is also overmolded to the second flange. On the inlet side of the solenoid a plug is secured to the first flange by threaded engagement or by welding. The second flange includes a stop portion which has axial and transverse bores therein. Radially spaced axially extending passageways communicate air or other fluid through the stop.

When the coil is energized, the plunger moves from its first position to its second position. Radially spaced axially extending passageways reside on the periphery of the plunger such that communication therebetween with the passageways of the stop is established when the coil is energized. A plug having a valve seat forms the inlet to the solenoid valve. A first elastomeric insert in the plunger interengages the valve seat of the plug prohibiting flow when the coil is deenergized and the plunger is in the first position. When the coil is energized, the first elastomeric insert and plunger move away from the valve seat of the plug opening the passageway and permitting flow of air or other fluid into and through the solenoid valve. When the coil is energized, the plunger moves to its second position.

When the plunger moves to its second position the second elastomeric insert therein engages the stop prohibiting air flow into the axial bore of the stop. When the plunger is urged to its first position under the influence of a spring operable between the first flux flange and the plunger, flow of air or other fluid is permitted through the axial bore and transverse bore of the stop and out of a notch in the second flux flange. Two notches exist in each flange and are spaced 180° from each other. The notches serve to aid the flow of air from the principal vent and from the leakage vent. The ferromagnetic journal is vented where the wires extend through the back side of the journal.

The journal mounted solenoid valve is used to control the supply of air to a clutch. When no air is supplied the clutch is engaged driving a 125 horsepower fan on a truck engine. When air is supplied to the clutch, the fan is disengaged. Bearings mounted on the ferromagnetic journal allow the rotation of a belt drive sheave. In the absence of air pressure of approximately 150 psig the belt driven sheave and clutch are rotated in unison. When the high power fan is disengaged, air is supplied to the clutch so as to separate the clutch from the sheave. When the clutch is engaged once again the air previously supplied to the clutch must be evacuated through the principal vent which includes passageways and bores in the stop. The leakage vent functions when air is supplied through the solenoid valve to the coupling. A non-rotating seal under the urging of a spring operating between a support and the seal engages a coupling which is rotating in unison with the sheave. If leakage of air occurs at the interface of the seal and the coupling then it must be evacuated. Leakage is evacuated through apertures in a locking flange, through notches in the flux flanges, through a small air gap between the flux flanges and the bore of the journal, and through an aperture in the bore to ambient atmosphere.

Accordingly, it is an object of the present invention to provide a solenoid valve mounted in a ferromagnetic journal and to use the ferromagnetic journal to complete the magnetic circuit.

It is a further object of the present invention to provide a second flux flange having an internal stop with radially spaced axially extending passageways therethrough and with axial and transverse bores.

It is a further object of the present invention to provide a second flux flange which includes a transverse bore.

It is a further object of the present invention to provide a plunger moveable between first and second positions and which includes passageways therethrough at the periphery thereof.

It is a further object of the present invention to provide a principal vent relieving pressure from a clutch and to provide a leakage vent for dissipating air which leaks from the seal-coupling interface when air is supplied to the clutch.

It is a further object of the present invention to provide a journal mounted solenoid valve for supplying air to a clutch.

It is a further object of the present invention to provide a solenoid valve which resides in the bore of a journal having a diameter of 1.25 inches.

These and other objects will be readily understood when reference is made to the Brief Description Of The Drawings, Description Of The Invention, and Claims which following hereinbelow.

BRIEF DESCRIPTION OF THE DRAWINGS

FIG. 4A is an enlarged portion of FIG. 3 illustrating the plunger spaced away from the stop as well as the axial and transverse bores in the stop.

The drawings will be best understood when reference is made to the Description Of The Invention and Claims which follow hereinbelow.

DESCRIPTION OF THE INVENTION

Figure 3:
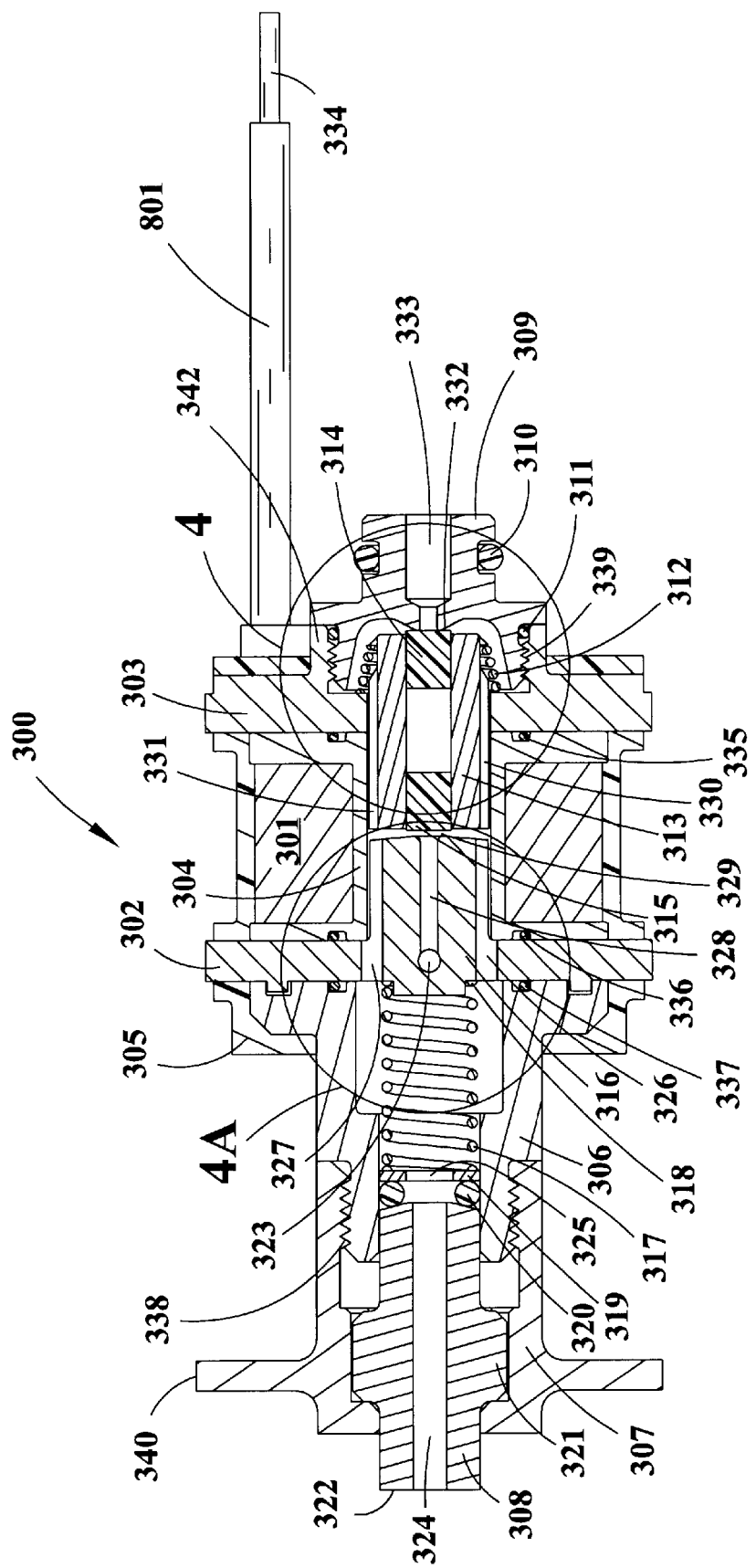
FIG. 3 is a cross-sectional view of the solenoid valve illustrating the coil deenergized and plunger in its first position engaging the plug. The overmolding extends through both flanges.

FIG. 3 is a cross-sectional view of the solenoid valve illustrating the plunger 313 in its first position engaging the plug 309. Reference numeral 300 generally designates this cross-sectional view of the solenoid valve with the coil 301 de-energized. First flux flange 303 and second flux flange 302 are illustrated in FIG. 3. Second flux flange 302 includes a stop portion 316. First flux flange 303 includes a threaded portion 342 for interengagement with plug 309. Plug 309 is affixed to the first flange 303 by a mechanical joint 339 which may be threaded or welded.

Figure 4:
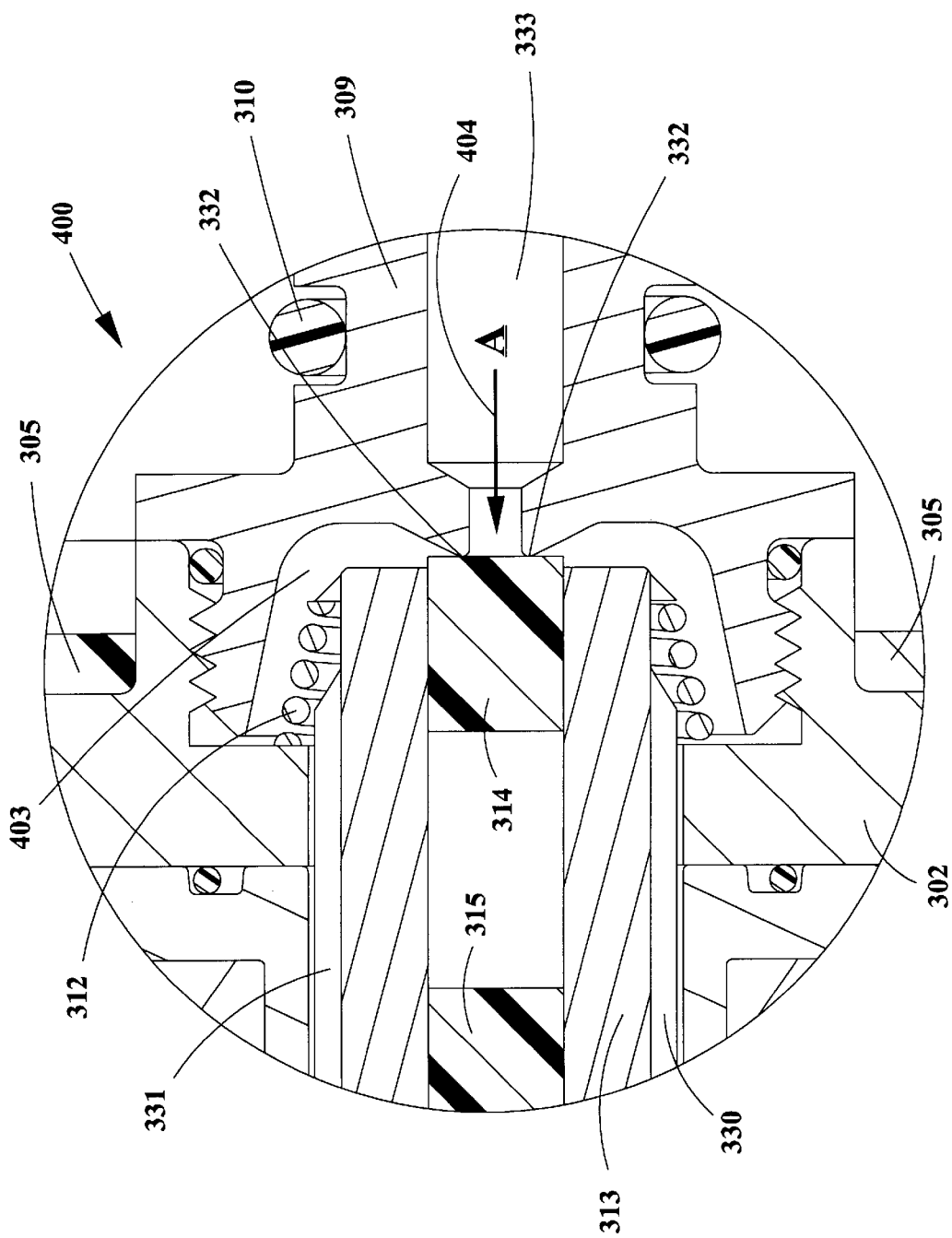
FIG. 4 is an enlarged portion of FIG. 3 illustrating the first insert of the plunger seated on the seat of the plug.

Plunger 313 includes first elastomeric insert 314 and second elastomeric insert 315. Elastomeric insert 314 seals against valve seat 332 when the coil is de-energized as illustrated in FIGS. 3 and 4. FIG. 4 is an enlarged portion of FIG. 3 illustrating the first elastomeric insert 314 of the plunger seated on seat 332 of the plug 309.

Figure 3A:
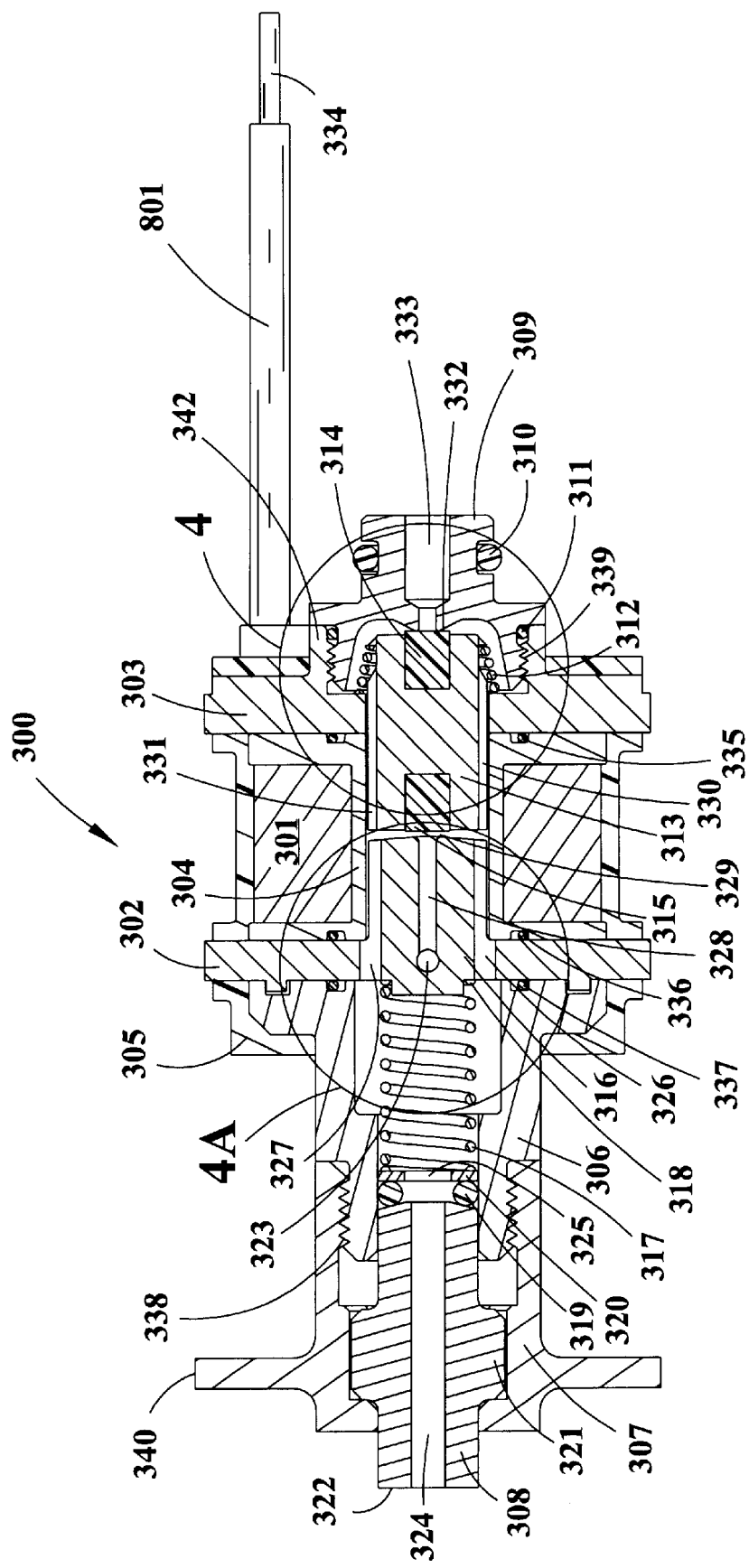
FIG. 3A is a cross-sectional view similar to FIG. 3 only a different plunger configuration is illustrated. The overmolding extends through both flanges.

FIG. 3A is a cross-sectional view similar to FIG. 3 only a different plunger configuration is illustrated wherein the plunger is not hollow in its center. This configuration of the plunger has slightly different magnetic properties when the magnetic circuit is considered.

Referring again to FIGS. 3 and 4 a spring 312 is operable between flange 303 and a lip on plunger 313. Spring 312 urges plunger 313 and hence elastomeric insert 314 rightwardly into engagement with valve seat 332 on plug 309.

Referring to FIG. 4 channels or grooves 330 and 331 comprise first and second passageways in plunger 313. As illustrated in FIG. 4 air designated with reference numeral 404 and the letter A is not admitted to the passageways 330 and 331 because spring 312 is exerting force on plunger 313 urging first elastomeric seal 314 into engagement with plug 309.

Passageways 330 and 331 are radially spaced axially extending passageways. Similarly, stop 316 includes radially spaced axially extending passageways 326 and 327. Other passageway configurations may be used. For instance, radially spaced axially extending bores may exist through the plunger. Passageways 326 and 327 extend through the stop portion 316 of the second flange 302. First and second flanges 303, 302, plunger 313, and stop 316 are all ferromagnetic materials which together with the ferromagnetic journal 1207 complete the magnetic circuit. Stop 316 further includes an axially extending bore 328 and a transversely extending bore 323. Axially extending bore 328 intersects and communicates with transversely extending bore 323. Bores 328 and 323 make up part of the path of the principal vent.

As illustrated in FIG. 3 which is the de-energized condition of the coil the principal permits air to be vented from the volume 111 within the clutch structure. FIG. 4A is an enlarged portion of FIG. 3 illustrating plunger 313 spaced away from the stop 316 as well as the axial 328 and transverse 323 bores in the stop 316. Referring to FIG. 4A reference numeral 401 generally indicates the enlarged view of the stop portion of FIG. 3 illustrating the air exhaust pathway 405. Air is exhausted along the pathway 405 as indicated by the arrows in FIG. 4A. Reference numeral 329 as illustrated in FIG. 3 and best viewed in FIG. 4A indicates a gap between the stop 316 and plunger 313.

Figure 13:
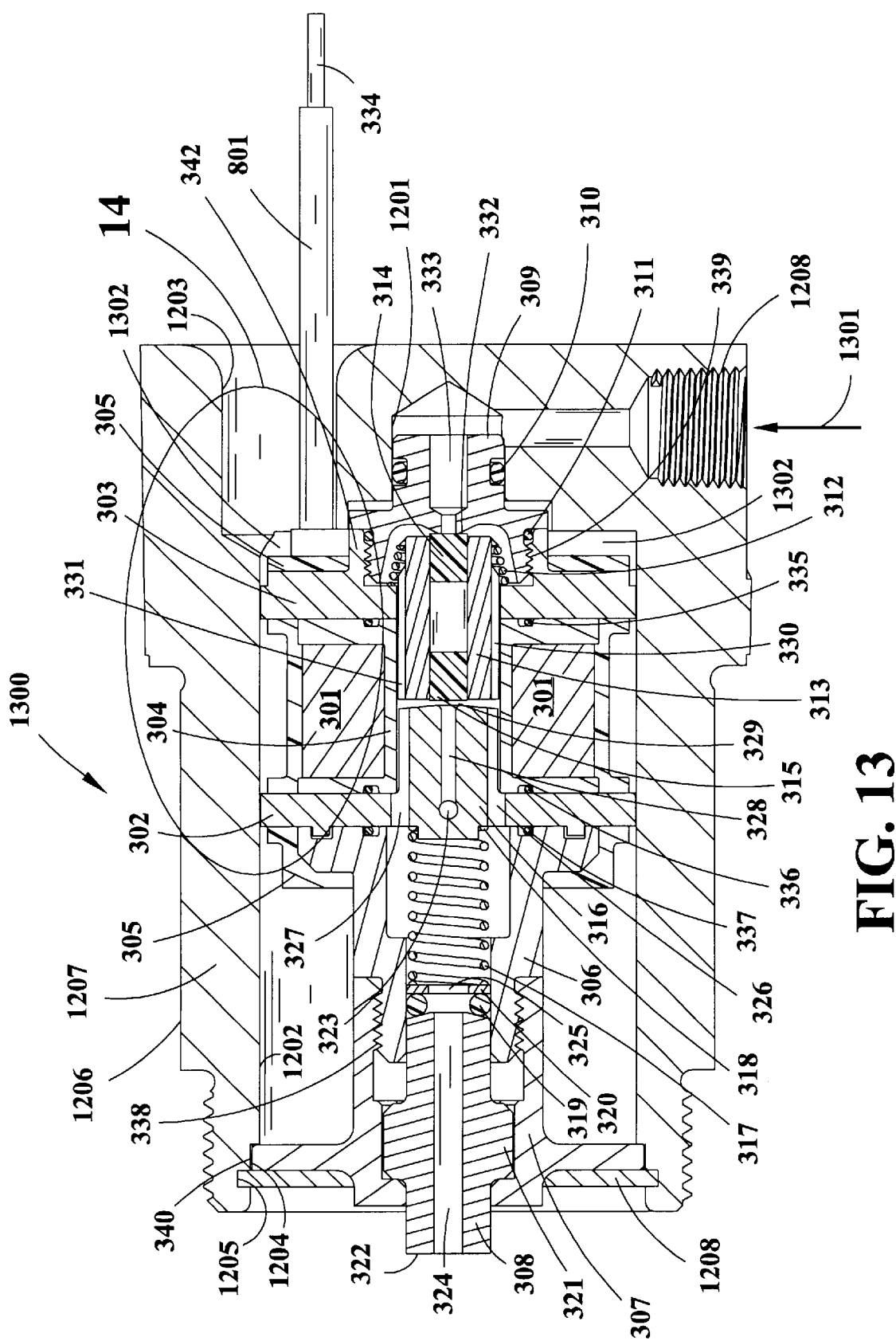
FIG. 13 is a cross-sectional view of the solenoid valve mounted within the ferromagnetic journal.

Referring again to FIG. 3, bobbin 304 has coil 301 wound therearound. The number of turns of the coil and the amperage in the coil for a given voltage is kept low through usage of a ferromagnetic journal which completes the magnetic circuit. One of the electrical leads 334 is illustrated in FIG. 3. First and second flux flanges 303 and 302 include radially spaced holes or apertures near the periphery thereof for the overmolding process. The holes or apertures in flange 303 secure it to the plastic 305. Overmolding is a process which employs a plastic such as nylon or polyester 305 which is applied over parts which are secured by clamps and the like. Once the overmolding is complete, the clamps are removed and the parts are held together by the plastic which has been molded thereover. Overmolding secures the first and second flanges 303, 302 against bobbin 304. Additionally, overmolding secures adapter 306 to the second flange 302. Extension 307 is affixed to adapter 306 by a mechanical joint 338 which may be threaded or snap-fit. Extension 307 includes a locking flange 340. Flange 340 together with snap ring 1208 secures the solenoid valve within the ferromagnetic journal as indicated in FIG. 13. FIG. 13 is a cross sectional view of the solenoid valve mounted within ferromagnetic journal 1207.

Figure 1:
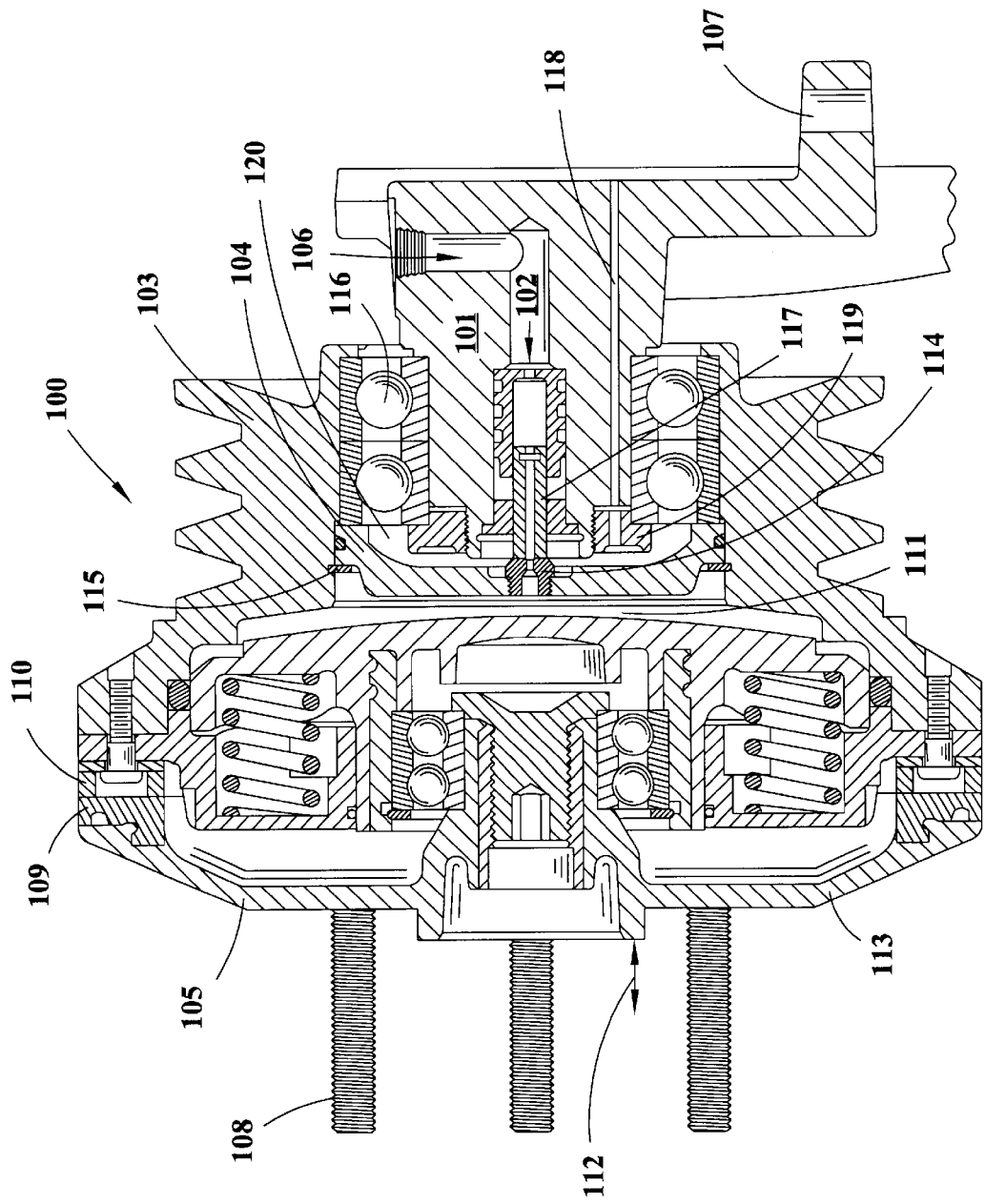
FIG. 1 is a cross-sectional view of the prior art illustrating a clutch operated by the application of air pressure through a seal.
Figure 2:
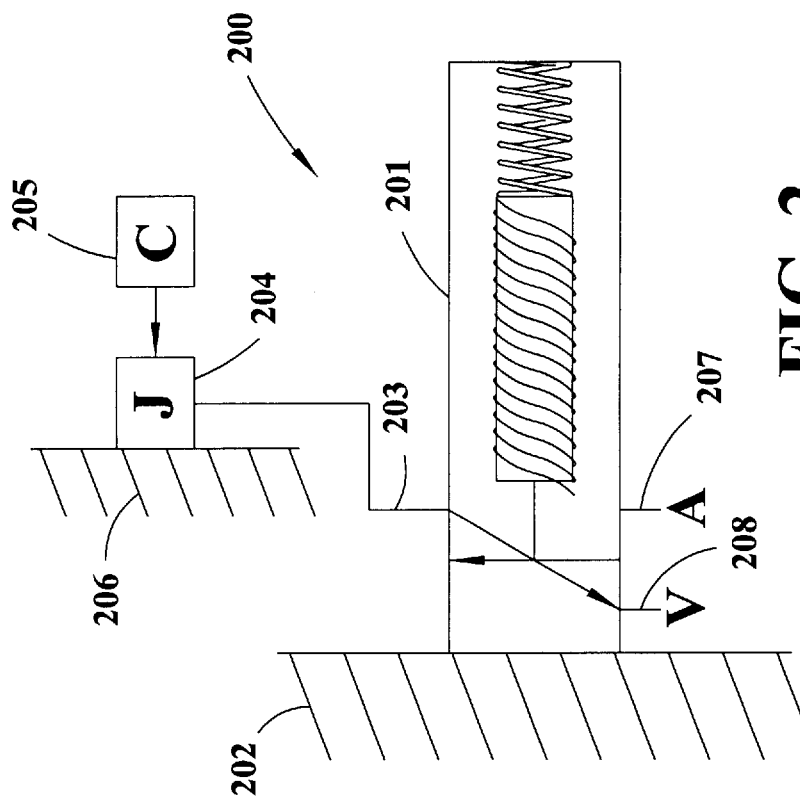
FIG. 2 is a schematic of the prior art illustrating a solenoid mounted on the firewall of a vehicle which vents the vehicle.
Figure 2A:
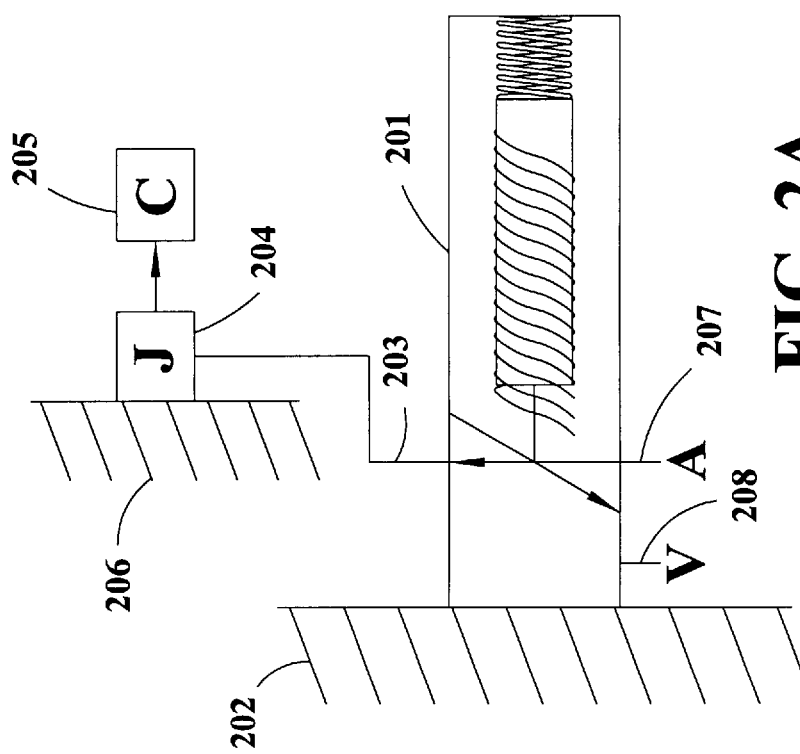
FIG. 2A is a schematic of the prior art illustrating a solenoid mounted on the firewall of a vehicle which supplies air to the clutch.

Referring again to FIG. 3 spring 317 is operable between a shoulder 318 on stop 316 and spring support 319. Adapter 306 and extension 307 affixed thereto comprise the housing of spring 317 (which is sometimes referred to herein as the second spring 317) and the seal 308. Spring support 319 includes a passageway 325 therethrough. Seal 308 also includes a passageway 324 therethrough. Seal 308 includes a keyed portion 321 which prevents rotation of the seal 308 when it engages the coupling 114 as illustrated in FIG. 1. Seal 308 is a grade of durable graphite material and includes a front sealing surface 322 which does wear slightly when it engages coupling 114 which rotates. Seal 320 interposed between spring support 319 and seal 308 is an elastomeric seal and prevents the escape of air from the solenoid valve.

Referring again to FIG. 3 seal 310 is an elastomeric seal between the plug 309 and the journal 1207. See, FIGS. 12 and 13. Seal 311 is an elastomeric seal between plug 309 and threaded portion 342 of first flange 303. Passageway 333 and plug 309 comprise the inlet to the solenoid valve. Similarly passageways 326 and 327 in the stop 306 comprise the outlets of the solenoid valve. Passageway 324 in seal 308 may also be the outlet of the solenoid valve. Seal 335 resides between the first flange 303 and the bobbin 304 as indicated by reference numeral 335. Correspondingly seal 336 resides between bobbin 304 and second flange 302. Similarly a seal 337 exists between the second flange 302 and adapter 306.

Figure 3B:
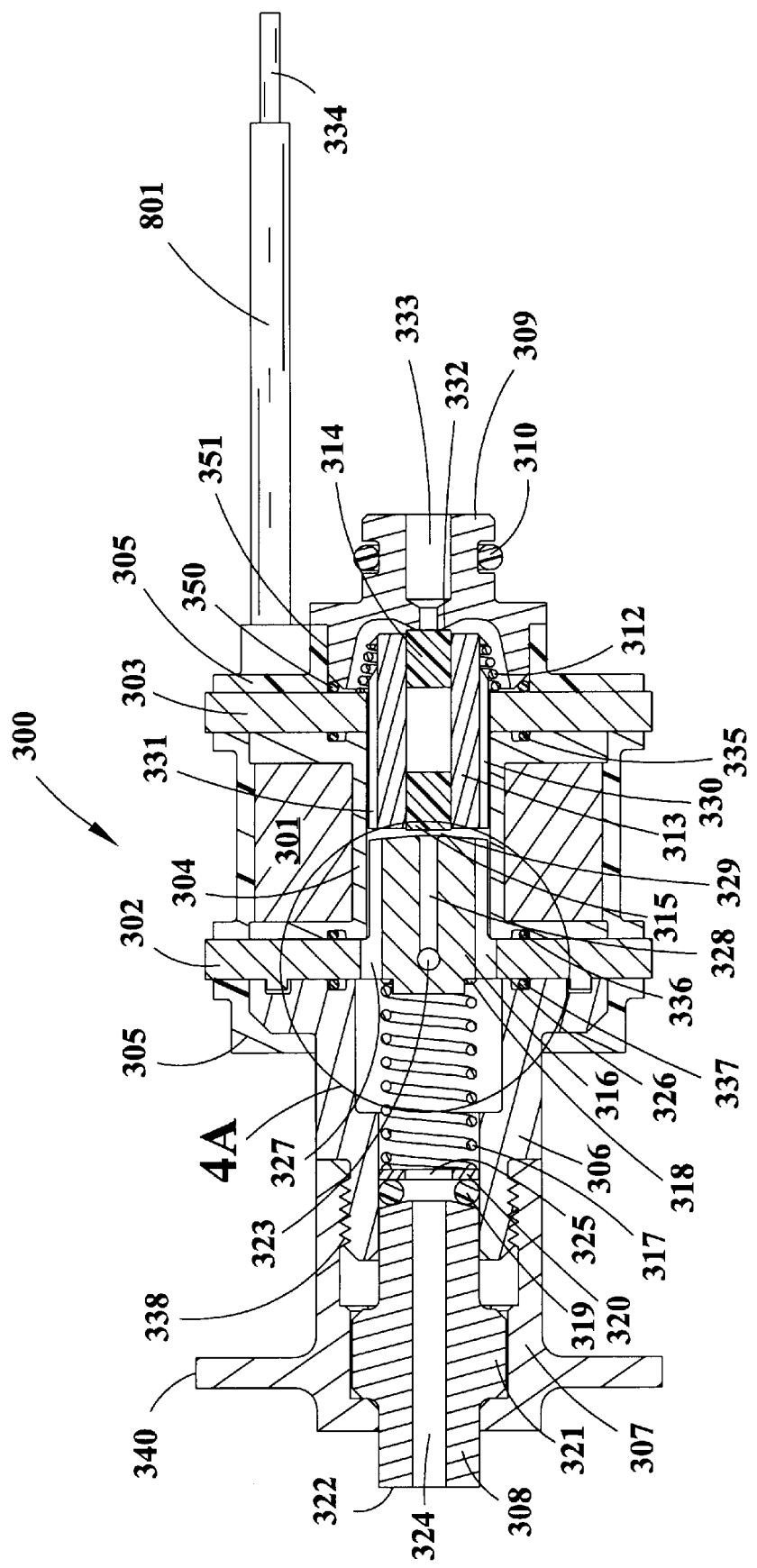
FIG. 3B is a cross-sectional view similar to FIG. 3 illustrating the overmolding creating the plug joint interface. The overmolding extends through both flanges.

FIG. 3B is a cross-sectional view similar to FIG. 3 illustrating the overmolding 305 extending through both flanges. Overmolding 305 in this view forms mechanical joint connection 351 which is welded to a plug 309 directly. In this embodiment threaded interconnection 339 of the flange 303 and plug 309 illustrated in FIG. 3 is not necessary. Seals 335, 336, 337 and 350 are used to ensure that air does not migrate along the faces of flanges 303 and 302 and plastic material 305 molded over these flanges. This prevents air from entering coil 301 or the electrical leads of the coil.

Figure 5:
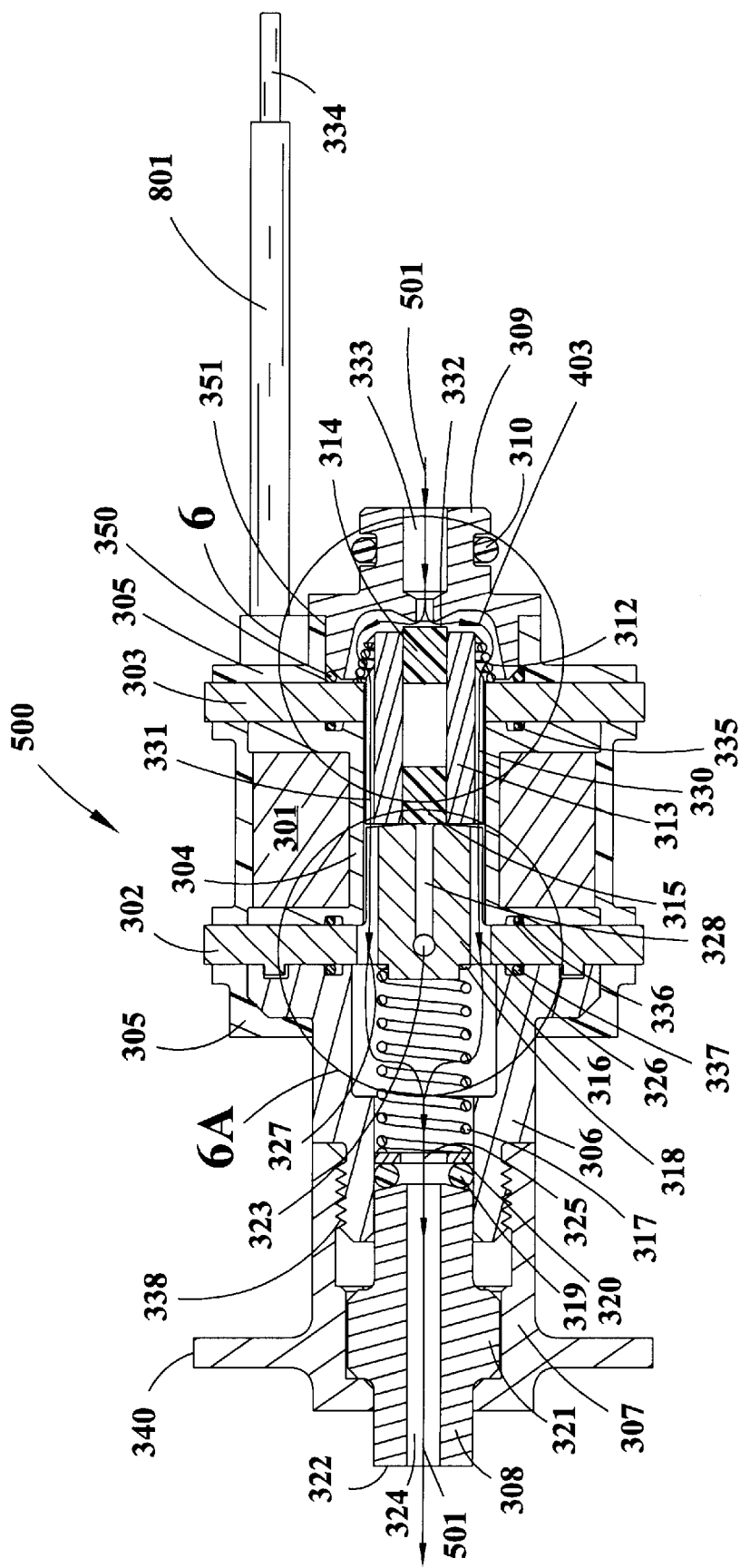
FIG. 5 is a cross-sectional view similar to FIG. 3B illustrating the plunger in its second position wherein air or other fluid may be admitted through the plug, around the spring, through the passageways of the plunger, through the passageways of the stop, through the adapter, and, through the seal.

FIG. 5 is a cross-sectional view similar view similar to FIG. 3 illustrating plunger 313 in its second position wherein air or other fluid may be admitted through the plug 309, around the spring 312, through the passageways 330, 331 of the plunger, through the passageways 326, 327 of the stop 316, around second spring 317, through the adapter 306, and finally through the seal 308. Arrow 501 indicates the air supply through the solenoid valve just recited. See, FIG. 5. Reference numeral 500 generally identifies the view just explained.

Figure 6:
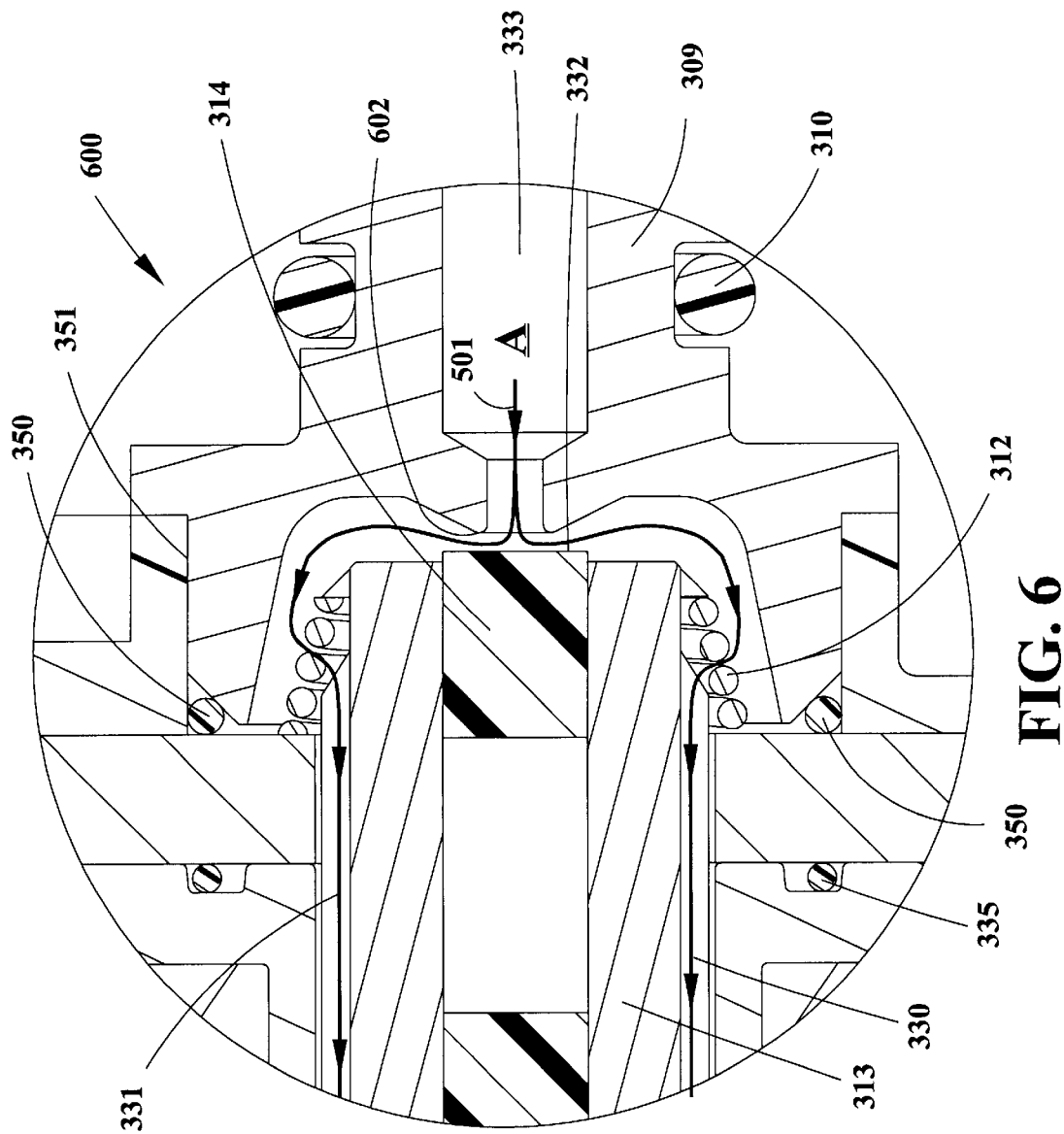
FIG. 6 is an enlarged portion of FIG. 5 illustrating the flow of air or other fluid past the first insert of the plunger, around the spring and through the passageways of the plunger.

FIG. 6 is an enlarged portion of FIG. 5 illustrating the flow of air 501 or other fluid past the first elastomeric insert 314 of plunger 313, around spring 312 and through the radially spaced axially extending passageways 330 and 331 of plunger 313. Valve seat 602 on plug 309 is best viewed in FIG. 6. Reference numeral 600 generally denotes the enlarged view of the portion of FIG. 5 just explained.

Figure 6A:
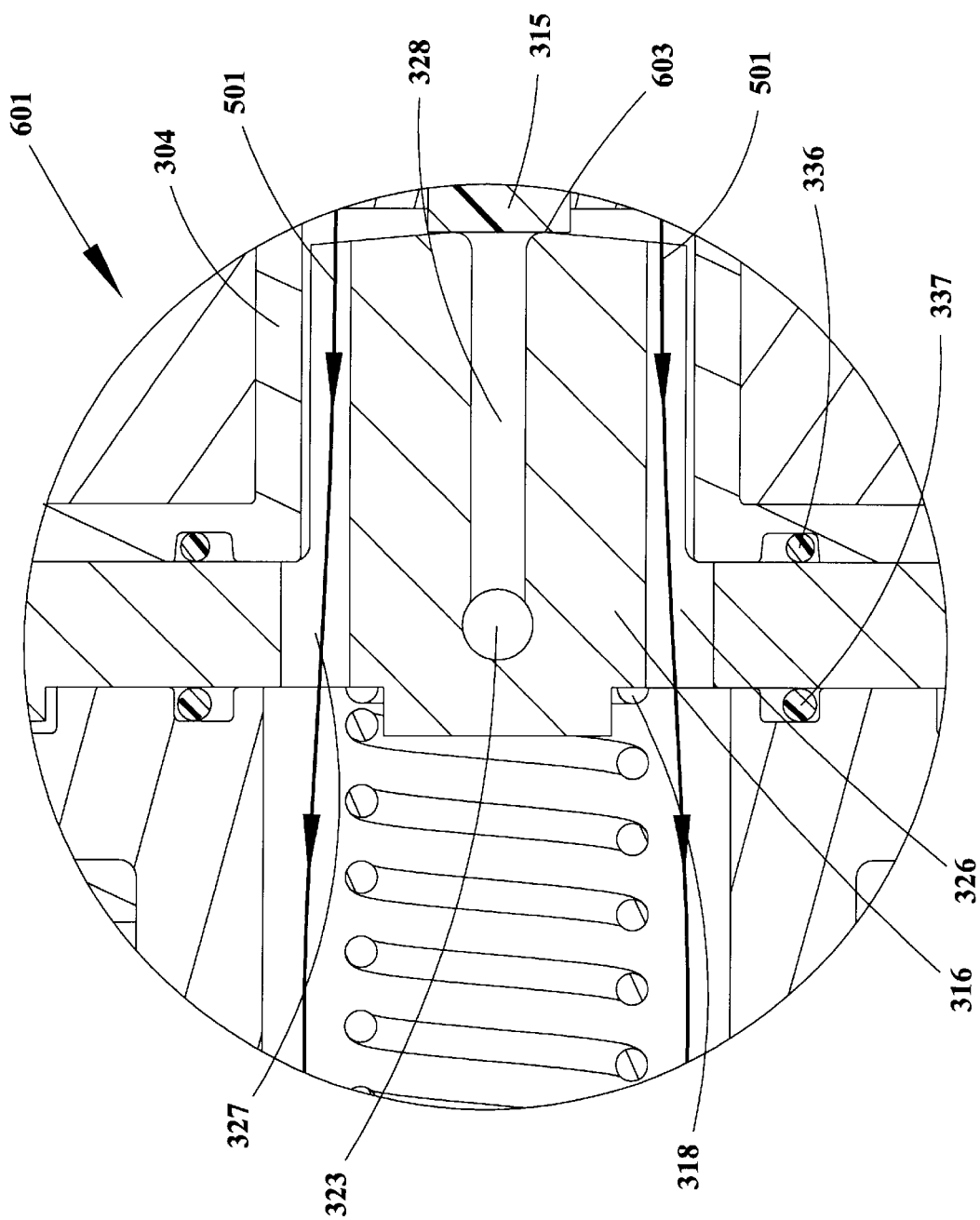
FIG. 6A is an enlarged portion of FIG. 5 illustrating the coil energized and the plunger in its second position engaging the stop portion of the second flange prohibiting flow through its principal vent.

FIG. 6A is an enlarged portion of FIG. 5 illustrating coil 301 energized and the plunger 313 in its second position engaging stop portion 316 of second flange 302 prohibiting flow through the principal vent valve. Valve seat 603 on stop 316 is best viewed in FIG. 6A. The principal vent valve is formed by the engagement of the second elastomeric insert 315 against valve seat 603. FIG. 6A also illustrates air flowing as indicated by arrows 501. Reference numeral 601 identifies the enlarged view of plunger 313 and second elastomeric insert 315 acting against valve seat 603 on stop 316.

Figure 7:
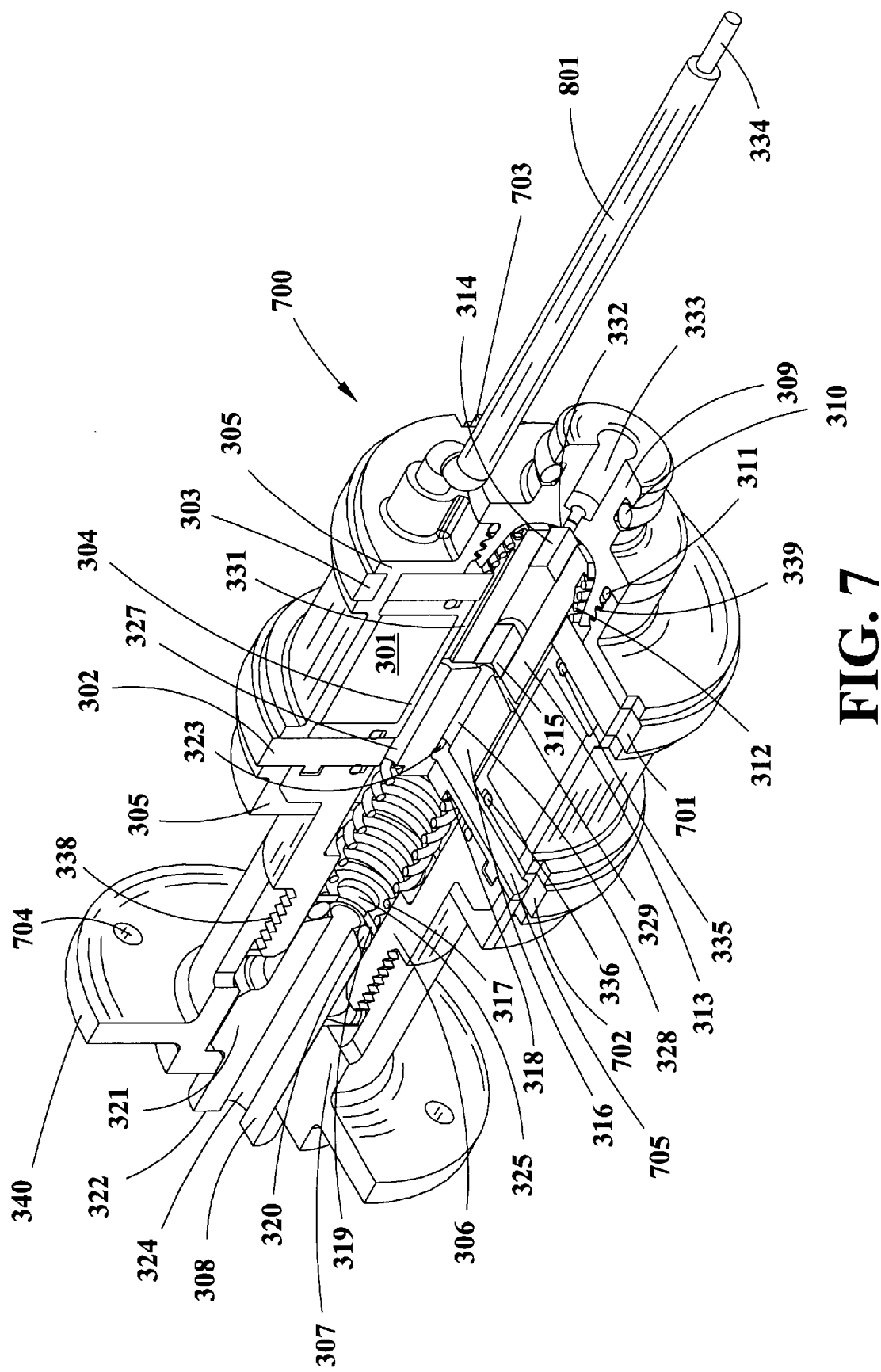
FIG. 7 is a quarter sectional perspective view of the solenoid corresponding to FIG. 3 with the coil deenergized.
Figure 7A:
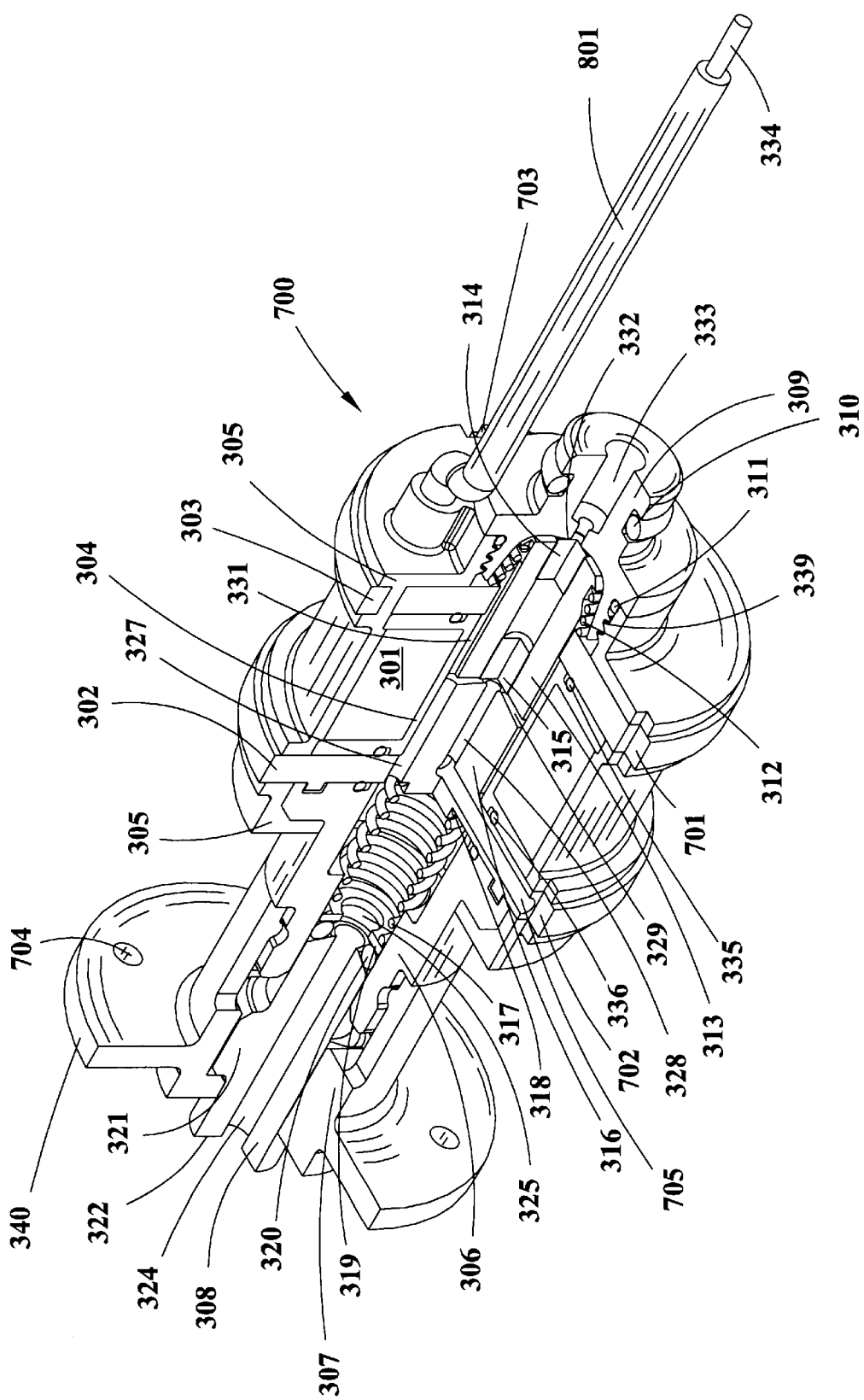
FIG. 7A is a quarter sectional perspective view of the solenoid similar to FIG. 7 with the extension pressed onto the adapter.

FIG. 7 is a quarter sectional perspective view of the solenoid corresponding to FIG. 3 with the coil de-energized. Reference numeral 700 generally identifies the solenoid valve having notch 701 in first flux flange 303, notch 702 in second flux flange 302 and notch 703 in first flux flange 303. Not shown is another notch in flux flange 302 which is on the back side of the solenoid valve. FIG. 7 illustrates the principal vent pathway very well. The principal vent pathway begins at the end 322 of seal 308 and comprises passageway 324, passageway 325 through support 319, the passageway within and about spring 317, passageway 327 in the stop 316, the passageway formed by gap 329 between stop 316 and plunger 313, axial bore 328 in the stop 316, and finally, transverse bore 323 in stop 316. FIG. 7A is a view similar to FIG. 7 except extension 307 is snap fit over adapter 306 and is snugly held by this snap fit. In both FIGS. 7 and 7A, the overmolded material creates a threaded mechanical connection which fastens to plug 309 and is similar to that illustrated in FIG. 3B.

Figure 8:
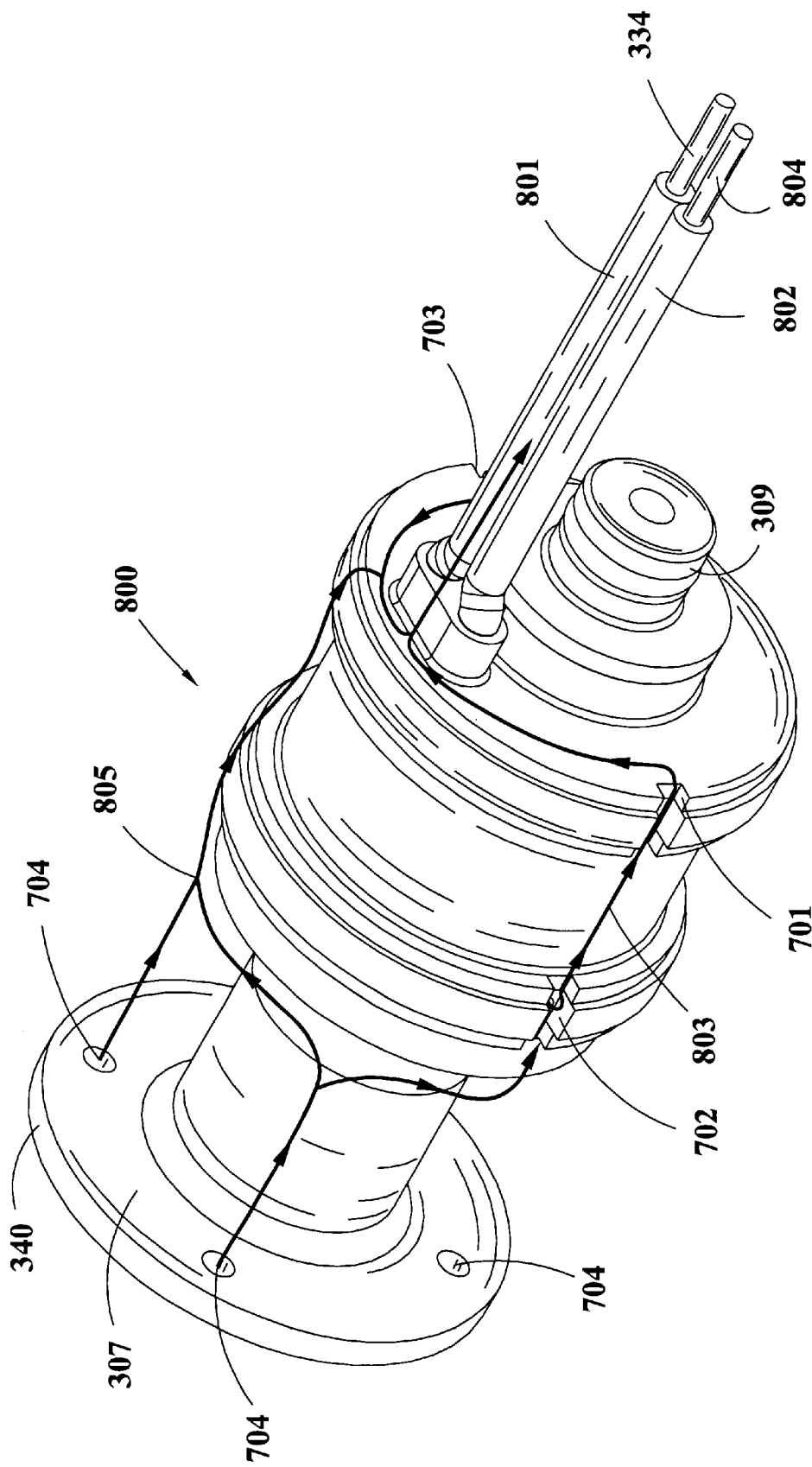
FIG. 8 is a perspective view of the solenoid valve and the flange on the extension having apertures therein.

FIG. 8 is a perspective view 800 of the solenoid valve and flange 340 on extension 307 having apertures 704 therein. Insulation 801 is illustrated for electrical lead 334 as is insulation 802 for electrical lead 804. The portion of the principal vent path outside of the solenoid valve is illustrated with reference numeral 803. The leak vent path is denoted with reference numeral 805. See, FIG. 8. Leakage of air is vented around the exterior of the solenoid valve between the flanges and the bore of the ferromagnetic journal and through the notches. Since the notches present a larger passageway the air that is leaked from the interface of the seal 308 and coupling 114 will proceed through the notches as does the air which emanates from transverse bore 323. The leakage vent is active only when air is being supplied through the solenoid (coil energized) and to volume 111 of the clutch mechanism. The principal vent is active only when air is not being supplied through the solenoid (coil deenergized).

Figure 9:
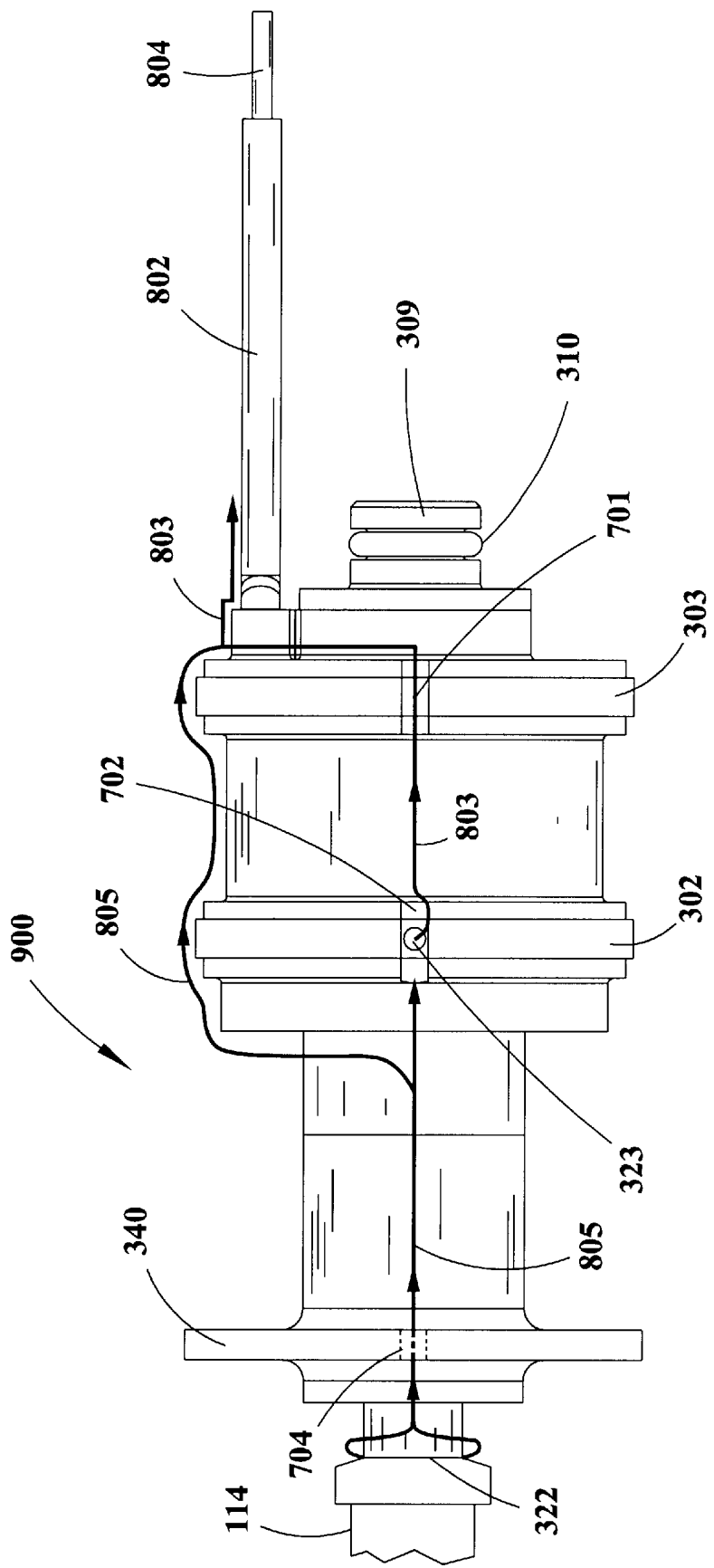
FIG. 9 is a side view of the solenoid valve illustrating notches in the first and second flanges and the transverse bore in the second flange.
Figure 11:
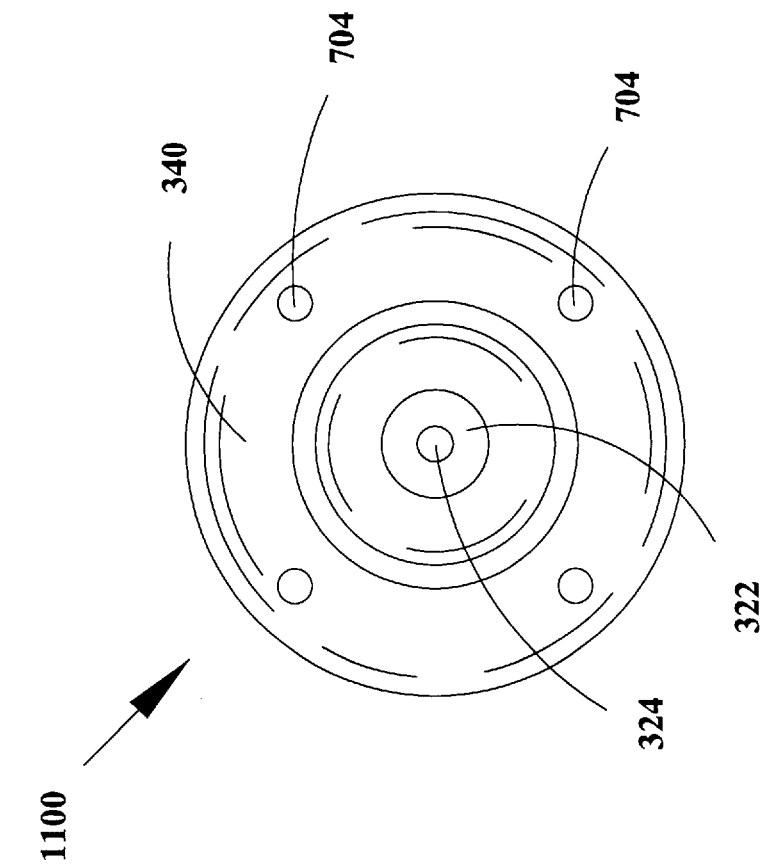
FIG. 11 is an outlet end view of the solenoid valve illustrating apertures in the flange of the extension.
Figure 10:
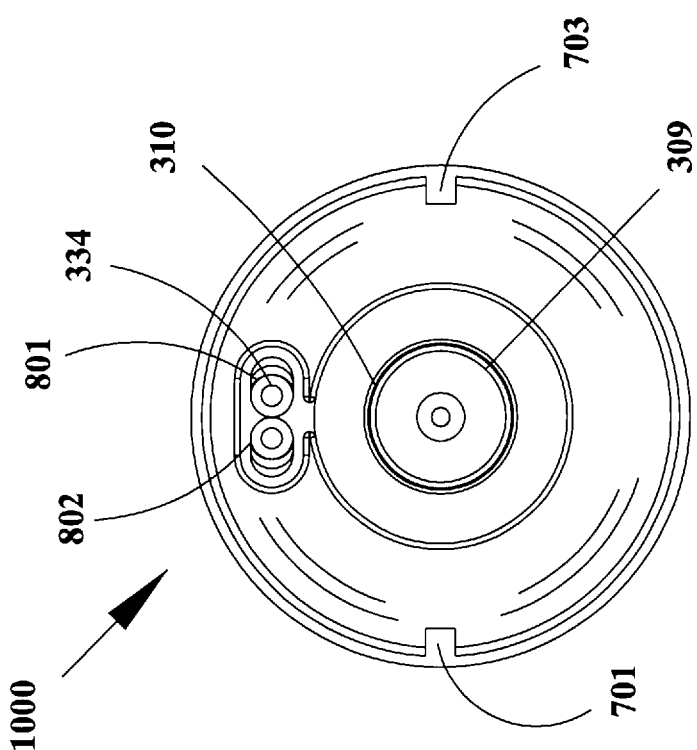
FIG. 10 is an inlet end view of the solenoid valve illustrating notches in the flanges.

FIG. 9 is a side view of the solenoid valve illustrating notches 701 and 702 in flanges 303 and 302, respectively. Principal vent path 803 is also illustrated in FIG. 9. FIG. 9 illustrates air leaking from the face 322 of seal 308 which abuts coupling 114. FIG. 10 is an inlet end view of the solenoid valve illustrating notches 701 and 703 in first flux flange 303. Plug 309 may be thought of as the inlet side of the solenoid valve. FIG. 11 is an outlet end view of a solenoid valve illustrating apertures 704 for the passage of leakage air through the flange 340 of the extension 308.

Figure 12:
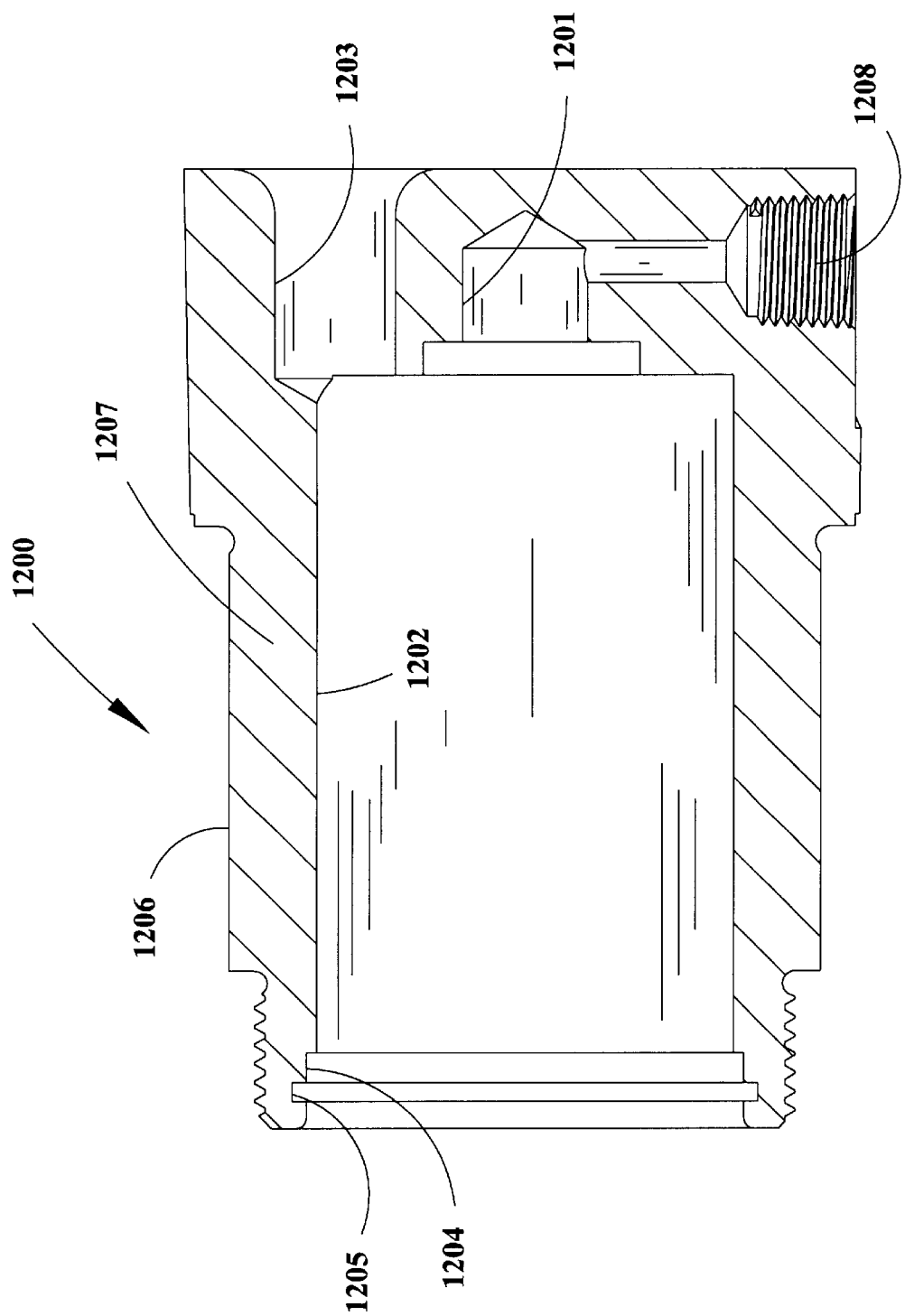
FIG. 12 is a cross-sectional view of the ferromagnetic journal.

FIG. 12 is a cross-sectional view 1200 of the ferromagnetic journal 1207. Plug receptacle 1201 receives plug 309. Bore 1202 has a diameter which is slightly larger than the diameter of the flux flanges 303 and 302. The diameter of the bore 1202 is approximately two to four-thousandths of an inch greater than the diameter of flux flanges 302 and 303. The diameter of the bore is 1.25 inches (31.75 mm) and the wall thickness is approximately 0.25 inches (6.35 mm).

Those skilled in the art upon reading the teachings of this disclosure will recognize that different ferromagnetic journal materials other than carbon steel may be used. Additionally, different bore diameters may be used depending on the design considerations of the magnetic circuit and the strength of the spring urging the plunger into its first position seating first insert 314 against seat 332. Additionally, different wall thicknesses may be used depending on the permeability of the ferromagnetic material and the design considerations of the magnetic circuit. Operation of the coil at different voltages and currents will also vary depending on the number of turns of the coil and the orientation and materials used in the magnetic circuits.

The instant invention employs flanges having air gaps of 0.001 to 0.002 inches. Other air gaps may be used without departing from the spirit and scope of the appended claims. Use of flanges having air gaps of 0.001 to 0.002 inches facilitates assembly of the solenoid valve. To assemble the solenoid valve and mount it within a ferromagnetic journal the following steps occur. A coil 301 is wound around a plastic bobbin. The coil 301 is threaded over and through the plastic bobbin. O-ring 335 is positioned in a groove on the end of bobbin 304 and flange 303 is placed into engagement with bobbin 304, covering both bobbin and O-ring. O-ring 336 is positioned in a groove on the other end of bobbin 304 and second flange 302 having stop 316 is placed into engagement with bobbin 304, covering both bobbin and o-ring. At this time the flanges are held together by hand or by a clamp. O-ring 337 is positioned in a groove on adapter 306, and the adapter is placed by hand or clamped into engagement with second flange 302. The parts are placed within a mold. Plastic is then molded over the coil 301, through apertures in flanges 303 and 302 and over adapter 306. Plastic may be molded to form a threaded joint feature 339 or a welded joint feature 351.

Spring 312 is interposed between ferromagnetic plunger 313 and flange 303 and the plunger is then inserted within bobbin 304. Plug 309 is placed into engagement with the first insert 314 of the plunger and through mechanical engagement with mechanical joint feature 339 or 351.

Spring 317 is inserted into the bore of adapter 306 followed by spring support 319 and elastomeric seal 320. Seal 308 having at least two flat external surfaces is then inserted into extension 307 which includes two correspondingly flat interior surfaces so as to prevent rotation of the seal with respect to the extension. Next, extension 307 is threaded onto threads on the adapter 306. Alternatively, the extension 307 may be pressed onto or snapped over a protrusion on the adapter 306.

Aperture 1203 in journal receives the electrical adapter, insulation and conductors. Aperture 1203 serves an important function of venting the principal vent and also the leakage vent. Groove 1204 receives flange 340 of the solenoid valve. Snap ring 1208 engages flange 340 of extension 307 and secures the solenoid valve within the journal. Press-fit bearings reside upon surface 1206 of the journal. Body 1207 of the journal is carbon steel which is a ferromagnetic material having a high permeability. Air is supplied to the journal housing 1208. Finally, journal 1200 is affixed to the front end of a truck engine block in the same manner that the prior art journal 101 is affixed to the front of a truck engine block.

FIG. 13 is a cross-sectional view 1300 of the solenoid valve mounted within the journal 1207. Air supply 1301 is illustrated in FIG. 13 as being in communication with plug receptacle 1201. Snap ring 1205 is illustrated in FIG. 13 as engaging flange 340 securing the solenoid valve within the ferromagnetic journal 1207.

Figure 14:
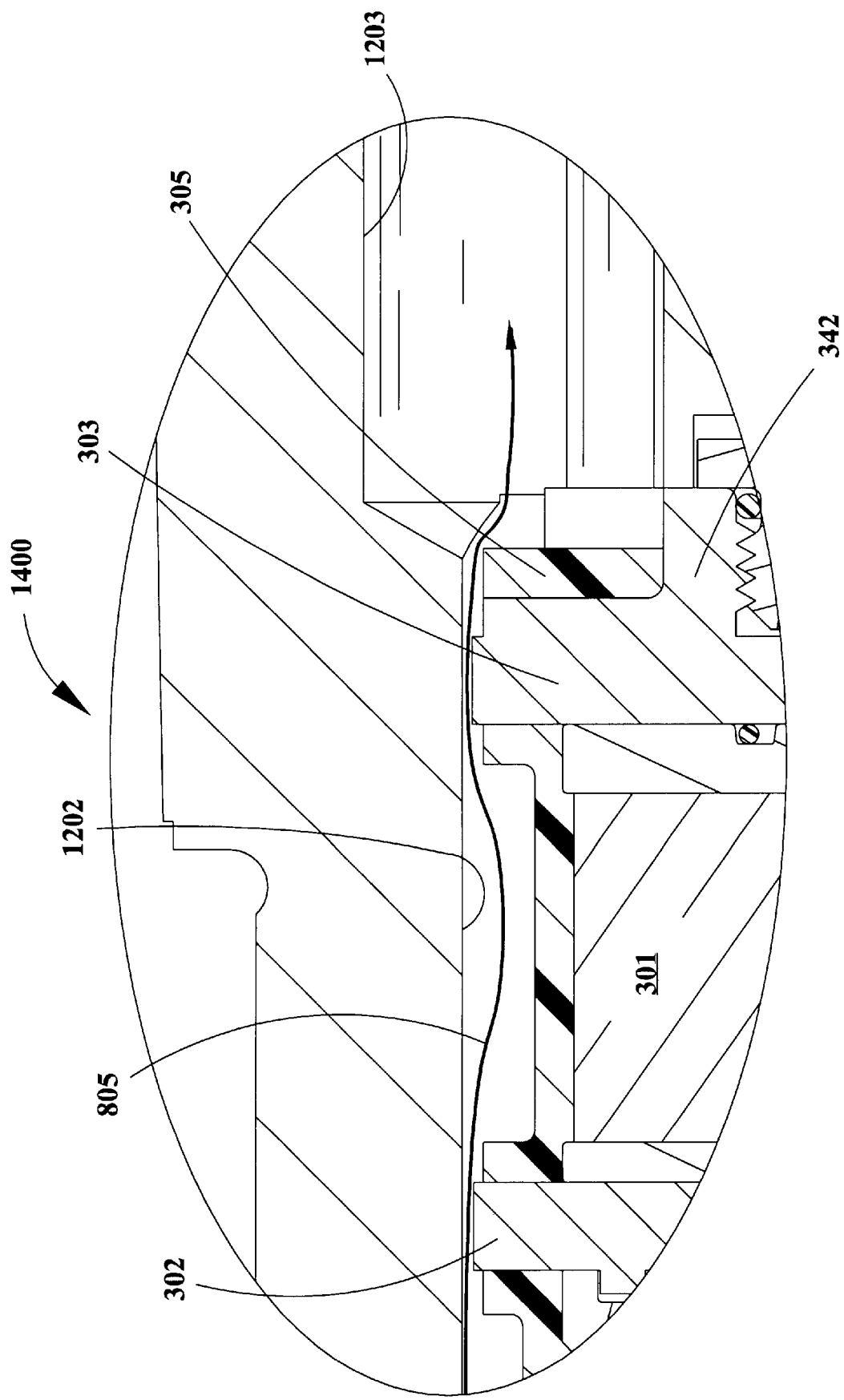
FIG. 14 is an enlarged portion of FIG. 13 illustrating the leak vent path around the flanges and out the wire aperture in the journal.

FIG. 14 is an enlarged portion of FIG. 13 illustrating another leak vent path around the flux flanges and out the wire aperture 1203 in the journal. Reference numeral 1400 indicates the enlarged portion of FIG. 13 and an air path is illustrated between the flanges 303, 302 and the bore 1202. Referring to FIGS. 3, 8, 9 and 13, air may flow in the annular area 1302 around flange 342 and communicate with opening 1203 in the journal. Notches 701, 702 and 703 provide high capacity for venting enabling efficient operation of the clutch.

Those skilled in the art will readily recognize that many changes and modifications may be made to the invention described in particularity herein without departing from the spirit and scope of the appended claims.

We claim:

1. A journal mounted solenoid valve, said journal having a cylindrical bore therein, comprising: a coil; a plunger; first and second flux flanges mounted about said coil; said second flange includes a stop portion; said flanges residing loosely in said bore of said journal; and, upon energization of said coil a magnetic circuit is formed comprising said plunger, said flanges, and said journal.

2. A solenoid valve as claimed in claim 1 further comprising an adapter affixed to said second flange and an extension affixed to said adapter; a seal; a spring operable between said seal and said second flange.

3. A solenoid valve as claimed in claim 2 wherein said extension includes a locking flange.

4. A solenoid valve as claimed in claim 3 wherein said locking flange includes at least one aperture therein.

5. A solenoid valve as claimed in claim 2 wherein said adapter, said second flange and said coil are overmolded.

6. A solenoid valve as claimed in claim 2 wherein said adapter, said flanges and said coil are overmolded with plastic.

7. A solenoid valve comprising: a coil; first and second flux flanges; said second flange includes a stop portion; a plunger; a journal; and, said coil, said flanges and said plunger reside within said journal.

8. A solenoid valve as claimed in claim 7 wherein said journal is comprised of a ferromagnetic material.

9. A solenoid valve as claimed in claim 8 wherein said ferromagnetic material of said journal has a high permeability.

10. A solenoid valve as claimed in claim 7 further comprising a plug: said plug having a passageway therein; said plunger includes a radially spaced axially extending passageway; said stop includes a radially spaced axially extending passageway, and, upon energization of said coil, said passageways communicate.

11. A solenoid valve as claimed in claim 7 further comprising: a plug; said plunger includes first and second axial inserts; and, a spring urges said first insert of said plunger into engagement with said plug.

12. A solenoid valve as claimed in claim 7 further comprising: a plug; said plunger being movable between first and second positions; said plunger includes first and second axial inserts; a spring urges said plunger toward said plug into said first position; said spring urges said first insert of said plunger into engagement with said plug when said coil is not energized; and, when said coil is energized said plunger overcomes said urging of said spring and moves to said second position with said second insert engaging said stop.

13. A solenoid valve as claimed in claim 12 wherein: said plunger includes a radially spaced axially extending passageway; said stop includes a radially spaced axially extending passageway; and, upon energization of said coil said passageways communicate.

14. A solenoid valve as claimed in claim 7 further comprising: a plug; a spring operable against said plunger urging said plunger into engagement with said plug; said plunger includes a radially spaced axially extending passageway; said stop includes a radially spaced axially extending passageway; and, upon energization of said coil said plunger is urged to a second position compressing said spring and permitting communication between said passageway of said plug, and said radially spaced axially extending passageways of said plunger and said stop.

15. A solenoid valve as claimed in claim 7 wherein said journal includes a bore; said stop portion of said flange includes axial and transverse bores, said transverse bore of said stop extends through said second flange and communicates with said bore of said journal; said stop portion of said second flange and said plunger being spaced apart when said coil is de-energized; said stop portion of said flange includes a radially spaced axially extending passageway therethrough; and, when said coil is de-energized said passageway communicates with: said space separating said stop and said plunger, said axial bore and said transverse bore of said stop and flange venting said valve.

16. A solenoid valve as claimed in claim 7 further comprising: a plug and an adapter; said journal being a ferromagnetic material; said adapter affixed to said second flange and said plug affixed to said first flange; and said coil, said flux flanges, said adapter and said plug secured together with plastic molded thereover.

17. A solenoid valve comprising: a bobbin; a coil wound about said bobbin; a first and second flange; said second flange includes a stop; a plunger; a journal having a bore; and, said flanges residing snugly within said bore of said journal.

18. A solenoid valve as claimed in claim 17 wherein said flanges have a diameter two to four thousandths of an inch smaller than the diameter of said bore of said journal.

19. A miniature solenoid valve comprising: first and second flux flanges; a coil; a bobbin; a plunger; a journal having a bore; and, said coil, said bobbin, said plunger, and said flux flanges residing in said bore of said journal.

20. A process for making a solenoid valve utilizing a ferromagnetic journal, a coil, a plug, an end cap, a plunger, a bobbin, a first flange, and a second flange having a stop, said first and second flanges having apertures therethrough comprising the steps of: inserting said plunger into said bobbin; inserting said stop of said second flange into said bobbin; winding said coil around said bobbin; positioning said first and said second flanges adjacent said bobbin; overmolding said first flange, said second flange, said bobbin and said coil with a polymeric material.

21. A process as claimed in claim 20 further comprising the steps of: inserting a seal between each of said flanges and said bobbin; inserting a seal between said flange and an adapter; and, inserting a seal between said plug and a mechanical joint.

22. A process as claimed in claim 21 wherein said mechanical joint is a threaded connection between said plug and said flange.

23. A process as claimed in claim 21 wherein said mechanical joint is a welded connection between said plug and said overmolded material.

24. A solenoid valve for engaging and disengaging a clutch comprising: a coil; a bobbin; said coil wound around said bobbin; a plunger having first and second positions; a first flux flange; a second flux flange having a stop portion comprising an outlet; an adapter affixed to said second flux flange; an extension affixed to said adapter; a first spring operating between said first flux flange and said plunger urging said plunger into said first position; a plug comprising an inlet affixed to said first flange; a seal; a second spring operable between said stop and said seal urging said seal into engagement with said clutch; said plunger includes at least one passageway therein; said stop includes at least one passageway therethrough, an axial bore and a transverse bore; a ferromagnetic journal having a bore; said solenoid residing within said ferromagnetic bore; and, when said coil is deenergized said plunger is in said first position engaging said plug prohibiting communication between said inlet and outlet; and, when said coil is energized said plunger is in said second position engaging said stop permitting communication between said inlet and outlet.

25. A solenoid valve comprising: a coil; a plunger; a first flange and a second flange; said valve residing in a journal; and, said journal together with said first flange, said second flange and said plunger form a magnetic circuit.

* * * * *